United States Patent Office 3,005,578
Patented Oct. 24, 1961

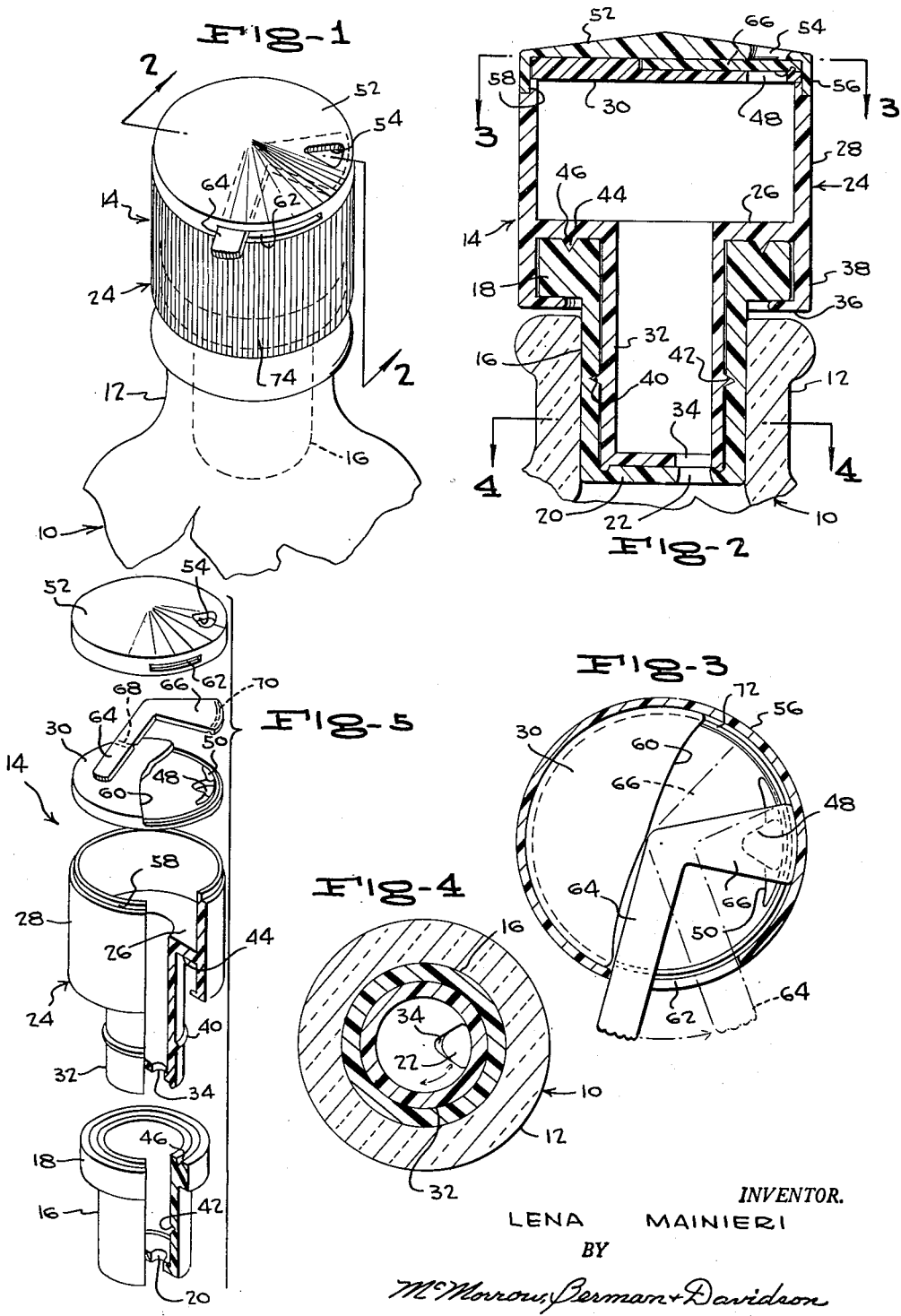

3,005,578
MEASURING ATTACHMENT FOR A BOTTLE NECK
Lena Mainieri, 150 State St. S., Hackensack, N.J.
Filed Dec. 19, 1958, Ser. No. 781,505
4 Claims. (Cl. 222—450)

The present invention relates to a measuring attachment for a bottle neck.

In the dispensing of small quantities of certain liquids, such as medicine and the like, accurate measurement of the liquid dispensed is desirable. Generally the quantity of the liquid to be dispensed is expressed in units of teaspoons, tablespoons, and fractional parts of the same. In household use are teaspoons and tablespoons designed more for appearance than accuracy of measurement or for the convenience of a user when dispensing a liquid such as a liquid medicine. One spoon may be of a shallower depth than another spoon of the same capacity. To gauge by the eye a half tablespoonful of liquid as it is poured into a tablespoon is often a difficult task for an individual to perform and frequently the individual may resort to dispensing the liquid in an amount greater than prescribed to be on the "safe" side. Not only is such overdispensing wasteful of the liquid dispensed, but frequently such overdispensing is not at all a safe procedure and may be in fact a dangerous practice.

An object of the present invention is to provide a measuring attachment for a bottle neck enabling the user thereof to accurately dispense liquids such as liquid medicines in small quantities.

Another object of the present invention is to provide a measuring attachment for a bottle neck which lends itself to ready insertion into and withdrawal from the neck of a bottle.

A further object of the present invention is to provide a measuring attachment for insertion in a bottle neck which is simple in structure, one sturdily constructed and having long-life characteristics, one economical to manufacture and assemble, and one highly effective in action.

These and other objects and advantages of the present invention will be fully apparent from the following description when taken in conjunction with the annexed drawing, in which:

FIGURE 1 is an isometric view of the upper end portion of a bottle having a neck, with the measuring attachment inserted in the bottle neck, the lower end portion of the bottle being broken away;

FIGURE 2 is a view on an enlarged scale, taken on the the line 2—2 of FIGURE 1;

FIGURE 3 is a view taken on the line 3—3 of FIGURE 2;

FIGURE 4 is a view taken on the line 4—4 of FIGURE 2; and

FIGURE 5 is an isometric exploded view showing the components of the measuring attachment according to the present invention.

Referring in greater detail to the drawing in which like numerals indicate like parts throughout the several views, in FIGURES 1, 2, and 4, the reference numeral 10 designates a bottle generally having a neck 12. The measuring attachment of the present invention is designated generally by the reference numeral 14 and comprises a mounting means in the form of a cup element 16 having the lower portion conformably shaped to be received within the neck 12 of the bottle 10.

An external flange 18 extends about the rim of the cup element 16. The cup element 16 has a bottom 20 in which there is an ingress opening 22.

A measuring receptacle 24 is provided by the present invention and it includes a bottom 26 and a wall 28 rising from and extending about the perimeter of the bottom 26. A cover 30 closes the upper end of the wall 28.

A hollow stem 32 depends from the bottom 26 centrally thereof and has an ingress opening 34 in the lower end. The receptacle 24 is positioned so that the stem 32 is received within the lower end portion of the cup element 16 with the bottom 26 resting upon the upper face of the flange 18, as shown in FIGURE 2.

Means is provided connecting the receptacle 24 to the cup element 16 for rotational movement relative to the cup element 16. Specifically, this means comprises an inwardly turned flange 36 on the lower end of a skirt 38 which depends from the bottom 26 of the receptacle 24 contiguous to and in alignment with the wall 28. The means also includes a ring 40 extending about the stem 32 intermediate the ends of the latter and slidably received in a complementally formed groove 42 provided on the inner surface of the lower end portion of the cup element 16 at a point spaced above the cup element body 20. The means also includes an annular projection 44, triangular in shape, carried on the under surface of the receptacle bottom 26 and slidably received within a complementally shaped groove 46, formed in the upper face of the flange 18.

The cover 30 is provided with an egress opening adjacent the periphery thereof as designated by the numeral 48 in FIGURES 2 and 5. Preferably, the cover 30 is provided with opposed channels 50 on each side of the egress opening 48, for a purpose which will be described later.

A cap 52 bridges the cover 30 and is secured to the cover 30 and also to the upper end of the receptacle wall 28. The cap 52 is provided with a discharge orifice 54 in registry with the egress opening 48 of the cover 30.

A skirt 56 depends from the perimeter of the cap 52 and overlies the perimeter of the cover 30. The lower end portion of the skirt 56 is received in the rabbett 58 provided in the upper end of the wall 28 of the receptacle 24. Suitable cement is used to secure the cap 52 to the wall 28 with the cover 30 interposed between the upper end of the wall 28 and the underface of the cap 52.

The cover 30 is provided with a cutaway portion on its upper face, shown most clearly in FIGURE 5 and designated by the reference numeral 60. The skirt 56 of the cap 52 is provided with a closed slot 62 through which projects the free end portion of an arm 64 which has its other end formed integrally with the inner end of a segment-shaped shutter 66. The arm 64 and shutter 66 are provided on their undersurfaces with arcuately shaped grooves 68 and 70, respectively, which receive an upstanding bead 72 provided on the upper face of the cover 30 adjacent the perimeter thereof and on each side of the egress opening 48.

The shutter 66 is normally between and bridges the registering discharge orifice 54 and the egress opening 48 is the cover 30. The grooves 68 and 70 and the cooperatively shaped bead 72 connect the arm 64 and shutter 66 to the cover 30 for movement from the full line position in FIGURE 3 bridging the orifice 54 and egress opening 48 to a position shown in dotted lines in FIGURE 3 out of bridging relation with respect to the orifice 54 and egress opening 48. The slot 62 also connects the shutter 66 to the cap 52 for the limited rotary movement from the bridging position to the position out of bridging relation with respect to the aforesaid orifice and opening.

Hand grip means is provided on the receptacle 24 for effecting the rotation of the receptacle 24 so that the ingress opening 34 in the lower end of the stem 32 is in or out of registry with the ingress opening 22 in the bottom 20 of the cup element 16. Specifically, this hand grip means consists in a knurled surface, as at 74 in FIGURE 1, on the outer surface of the wall 28 of the receptacle 24.

In use, the lower end portion of the cup element 16 is inserted into the neck 12 of a bottle such as is designed by the numeral 10 and the cup element 16 is positioned so that the flange 18 is spaced slightly above the upper end of the neck 12. With a body of liquid within the bottle and a measured quantity to be poured therefrom, the bottle 10 and attached measuring attachment 14 is inverted with the shutter 66 bridging the egress opening 48 and the discharge orifice 54. The space within the stem 32 is preferably of a size to accommodate a unit of liquid measurement, a teaspoonful for instance. The space within the receptacle 24 above the bottom 26 is preferably of a size to accommodate another unit of liquid measurement, two teaspoonfuls for instance, so that the space within the stem 32 and the space within the receptacle 24 above the bottom 26 together accommodate another unit of measurement, three teaspoonfuls or one tablespoon.

With the bottle 10 inverted, the user may observe through the plastic and transparent wall 28 of the receptacle 24 the liquid flowing from the bottle 10 through the ingress openings 22 and 34 into the stem 32 and thence into the space between the receptacle bottom 26 and the cover 30 as enclosed by the wall 28.

If it is desired to dispense only a teaspoonful of the liquid from the bottle 10, the user permits the liquid to flow into the receptacle for a period of time estimated by the user sufficient in length to enable liquid in the amount of one teaspoonful to fill the receptacle above the bottom 26 to one-half full. Upon shifting the bottle 10 to the erect position, the user will be able to observe through the transparent receptacle 24 whether or not the space within the stem 32 has been filled, first rotating the receptacle 24 relative to the cup element 16 so as to move out of registry the ingress openings 22 and 34. If the user has more or less than one teaspoonful in the space within the stem 32, the user may either rotate the receptacle 24 to bring into registry the openings 22 and 34 to permit liquid to flow from the stem 32 back into the bottle 10, in case two much liquid was obtained in the first operation, or the user may reinvert the bottle 10 and permit more liquid to flow through the openings 22 and 34 with the latter in registry with each other until a sufficient amount of liquid enters the receptacle 24 to fill the stem 32 when the bottle is again in the erect position with the openings 22 and 34 closed.

With the desired quantity of liquid in the stem 32 and in the receptacle 24 above the bottom 26, the user shifts the arm 64 from the full line position to the dotted line position in FIGURE 3 so as to move the shutter 66 out of registry with the egress opening 48 and discharge orifice 54 to permit liquid to flow from the receptacle 24 in the desired and measured quantity.

Any liquid remaining on the upper surface of the cover 30 adjacent the egress opening 48 may drain back into the receptacle 24 through the channels 50 which have their one ends in communication with the egress opening 48.

What is claimed is:

1. A measuring attachment for a bottle neck comprising a mounting means adapted to be received within and supported by a bottle neck, said mounting means having an external flange extending about the rim thereof and ing an ingress opening in the bottom thereof, a measuring receptacle including a bottom, a wall rising from and extending about the perimeter of said bottom, a cover closing the upper end of said wall, and a hollow stem depending from said bottom and having an ingress opening in the lower end, said receptacle being positioned so that the hollow stem is received within said mounting means with the bottom supported upon said mounting means, means connecting said receptacle to said mounting means for rotational movement relative to said mounting means, said connecting means embodying a skirt depending from the receptacle bottom and contiguous to and in alignment with the receptacle wall and an inwardly turned flange on the bottom of said skirt, said skirt and inturned flange and the portion of said receptacle bottom between said skirt and said stem rotatably embracingly receiving said external flange, and a projection on the under face of the aforesaid portion of said receptacle bottom slidably received in a groove formed in the upper face of said external flange, said cover being provided with an egress opening, a cap bridging the cover and secured to the upper end of the receptacle wall, said cap having a discharge orifice in registry with the egress opening of said cover, and a shutter normally between and bridging the registering discharge orifice and egress opening and connected to said cover for movement from the bridging position to a position out of bridging relation with respect to said registering discharge orifice and egress opening.

2. A measuring attachment for a bottle neck comprising a mounting means adapted to be received within and supported by a bottle neck, said mounting means having an external flange extending about the rim thereof and having an ingress opening in the bottom thereof, a measuring receptacle including a bottom, a wall rising from and extending about the perimeter of said bottom, a cover closing the upper end of said wall, and a hollow stem depending from said bottom and having an ingress opening in the lower end, said receptacle being positioned so that the hollow stem is received within said mounting means with the bottom supported upon said mounting means, means connecting said receptacle to said mounting means for rotational movement relative to said mounting means, said connecting means embodying a skirt depending from the receptacle bottom and contiguous to and in alignment with the receptacle wall and an inwardly turned flange on the bottom of said skirt, said skirt and inturned flange and the portion of said receptacle bottom between said skirt and said stem rotatably embracingly receiving said external flange, and a projection on the under face of the aforesaid portion of said receptacle bottom slidably received in a groove formed in the upper face of said external flange, said cover being provided with an egress opening, a cap bridging the cover and secured to the upper end of the receptacle wall, said cap having a discharge orifice in registry with the egress opening of said cover, a shutter normally between and bridging the registering discharge orifice and egress opening and connected to said cover for movement from the bridging position to a position out of bridging relation with respect to said registering discharge orifice and egress opening, and hand grip means on said receptacle for effecting the rotation of said receptacle so that the ingress opening in said stem lower end is in or out of registry with the ingress opening in the bottom of said mounting means.

3. A measuring attachment for a bottle neck comprising a cup element having a lower portion conformably shaped to be received within a bottle neck and having an external flange extending about the rim thereof, there being an ingress opening in the bottom of said cup element, a measuring receptacle including a bottom, a wall rising from and extending about the perimeter of said bottom, a cover closing the upper end of said wall, and a hollow stem depending from said bottom and having an ingress opening in the lower end, said receptacle being positioned so that the hollow stem is received within the lower end portion of said cup element with the bottom resting upon said flange, means connecting said receptacle to said cup element for rotational movement relative to said cup element, said connecting means embodying a skirt depending from the receptacle bottom and contiguous to and in alignment with the receptacle wall and an inwardly turned flange on the bottom of said skirt, said skirt and inturned flange and the portion of said receptacle bottom between said skirt and said stem rotatably embracingly receiving said external flange, a projection on the under face of the aforesaid portion of said receptacle bottom slidably received in a groove formed in the upper face of said external flange, and a ring extending exteriorly about said stem between the ends thereof and slidably received in a groove formed in said cup element, said cover being provided with an egress opening, a cap bridging the cover and secured to the upper end of the receptacle wall, said cap having a discharge orifice in registry with the egress opening of said cover, and a shutter normally between and bridging the registering discharge orifice and egress opening and connected to said cover for movement from the bridging position to a position out of bridging relation with respect to said registering discharge orifice and egress opening.

4. A measuring attachment for a bottle neck comprising a cup element having a lower portion conformably shaped to be received within a bottle neck and having an external flange extending about the rim thereof, there being an ingress opening in the bottom of said cup element, a measuring receptacle including a bottom, a wall rising from and extending about the perimeter of said bottom, a cover closing the upper end of said wall, and a hollow stem depending from said bottom and having an ingress opening in the lower end, said receptacle being positioned so that the hollow stem is received within the lower end portion of said cup element with the bottom resting upon said flange, means connecting said receptacle to said cup element for rotational movement relative to said cup element, said connecting means embodying a skirt depending from the receptacle bottom and contiguous to and in alignment with the receptacle wall and an inwardly turned flange on the bottom of said skirt, said skirt and inturned flange and the portion of said receptacle bottom between said skirt and said stem rotatably embracingly receiving said external flange, a projection on the under face of the aforesaid portion of said receptacle bottom slidably received in a groove formed in the upper face of said external flange, and a ring extending exteriorly about said stem between the ends thereof and slidably received in a groove formed in said cup element, said cover being provided with an egress opening, a cap bridging the cover and secured to the upper end of the receptacle wall, said cap having a discharge orifice in registry with the egress opening of said cover, a shutter normally between and bridging the registering discharge orifice and egress opening and connected to said cover for movement from the bridging position to a position out of bridging relation with respect to said registering discharge orifice and egress opening, and hand grip means on said receptacle for effecting the rotation of said receptacle so that the ingress opening in said stem lower end is in or out of registry with the ingress opening in said cup element.

References Cited in the file of this patent

UNITED STATES PATENTS

| | | |
|---|---|---|
| 476,470 | Leslie | June 7, 1892 |
| 1,556,911 | Callender | Oct. 13, 1925 |
| 1,993,329 | Johnson | Mar. 5, 1935 |
| 2,346,134 | Kirkland et al. | Apr. 11, 1944 |
| 2,393,454 | Bailey | Jan. 22, 1946 |